Feb. 16, 1926.
S. A. WEITMAN
1,573,340
GRAIN TREATING MACHINE
Filed April 23, 1923  2 Sheets-Sheet 1
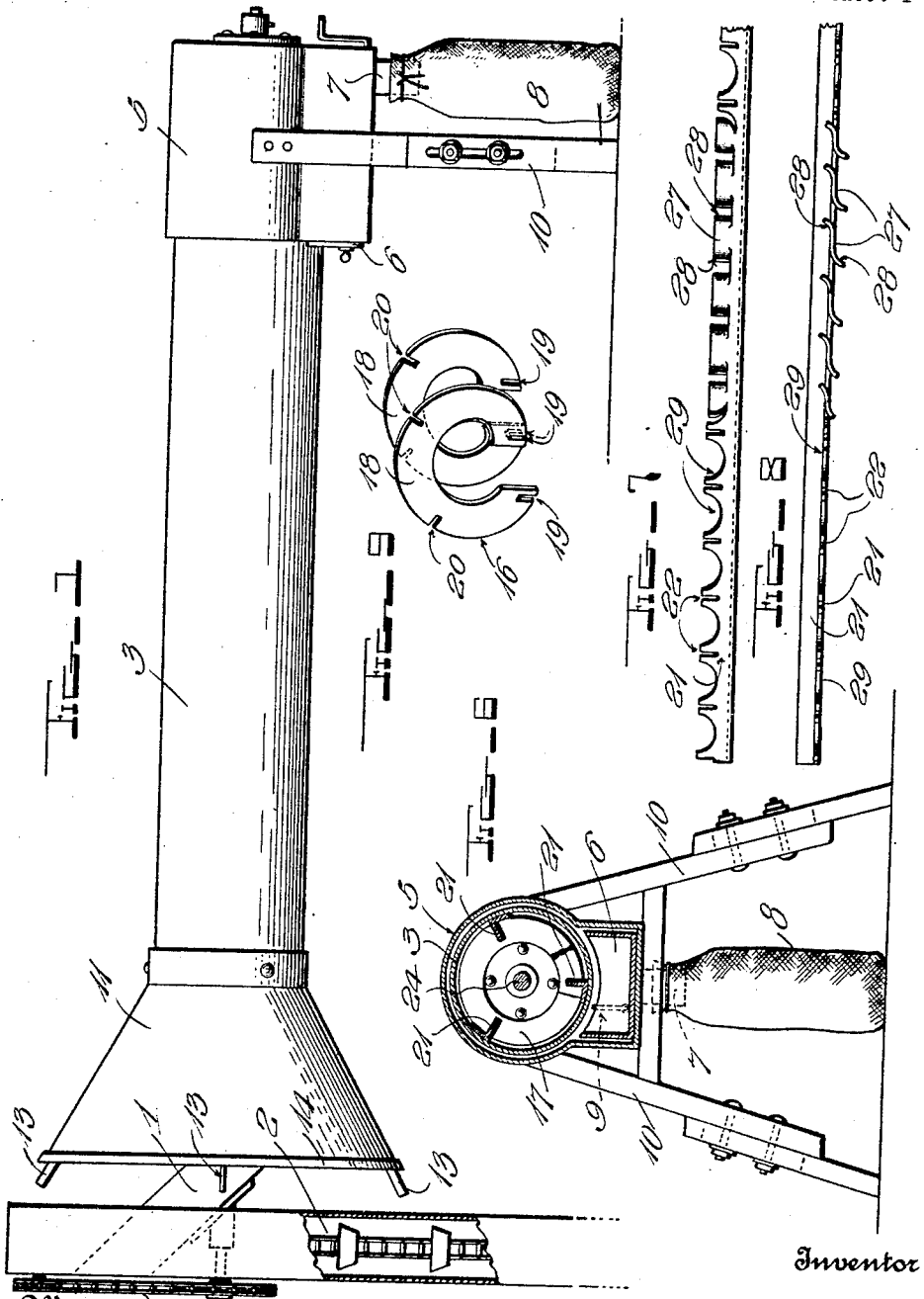
Inventor
Samuel A. Weitman Feb. 16, 1926.  
S. A. WEITMAN  
GRAIN TREATING MACHINE  
Filed April 23, 1923  
1,573,340  
2 Sheets-Sheet 2
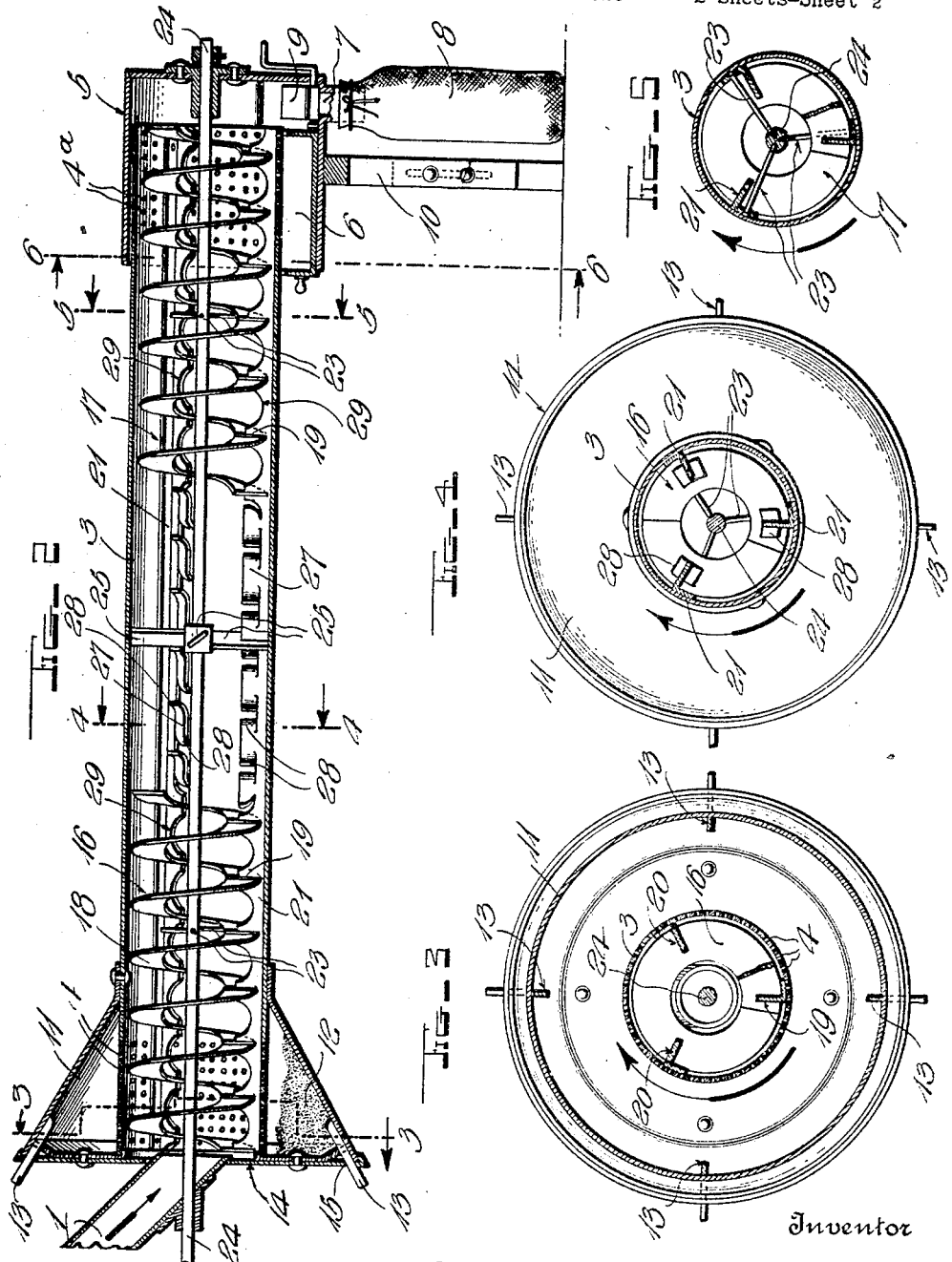
Inventor  
Samuel A. Weitman Patented Feb. 16, 1926.

1,573,340

UNITED STATES PATENT OFFICE.

SAMUEL A. WEITMAN, OF KAHLOTUS, WASHINGTON.

GRAIN-TREATING MACHINE.

Application filed April 23, 1923. Serial No. 634,119.

*To all whom it may concern:*

Be it known that I, SAMUEL A. WEITMAN, a citizen of the United States, residing at Kahlotus, in the county of Franklin and State of Washington, have invented certain new and useful Improvements in Grain-Treating Machines; and I do declare the following to be a full, clear, and exact description of the invention, such as will enable others skilled in the art to which it appertains to make and use the same.

My invention has for its object to provide a novel form of machine for treating seed grain with copper-carbonate or other desired fungicide, for the purpose of preventing the so-called "bunt" or "stinking smut". The present day methods of treating grain are not only very slow but require the expenditure of a great deal of labor, with the result that the cost of the treating process almost counterbalances the increase in the crop due to the treating. Furthermore, the laborers employed in the treating process very often have their health impaired by inhaling the copper-carbonate or other dust and fumes. My invention however, overcomes these difficulties by providing a substantially dust-tight machine which will rapidly operate and will receive the grain directly from the usual elevator of a grain cleaning machine, saving the trouble and expense of an additional handling between the cleaning operation and the treating process.

With the foregoing in view, the invention resides in the novel subject matter hereinafter described and claimed, the description being supplemented by the accompanying drawings.

Figure 1 is a side elevation of a grain treating machine constructed in accordance with my invention.

Figure 2 is a central vertical longitudinal sectional view.

Figures 3, 4, 5 and 6 are vertical transverse sections on lines 3—3, 4—4, 5—5 and 6—6 of Fig. 2.

Figures 7 and 8 are elevations of one of the holding bars for the sections of the conveyors hereinafter described.

Figure 9 is a detail perspective view showing more particularly the conveyor construction.

In the drawings above briefly described, I have shown my invention in position to receive the cleaned seed grain from the delivery chute 1 of the discharge conveyor 2 from a grain cleaning machine, it being understood however that the invention could be used separately from the cleaning machine if desired. The numeral 3 designates an elongated cylinder open at one end to receive the grain and open at its other end to discharge such grain after it has been treated in the cylinder. The inlet end of the cylinder 3 or other desired portion thereof, is formed with a multiplicity of perforations 4 and means are provided for discharging the treating powder or the like onto this perforated portion of the cylinder, so that it may enter the latter through the perforations, to be thoroughly mixed with the grain. Conveying means are provided in the cylinder to carry the grain and the treating medium toward the opposite end thereof while at the same time, effecting agitation and thorough mixture, to insure that all of the grain shall become coated. The discharge end of the cylinder is perforated as indicated at $4^a$ and like the perforations $4^c$, these perforations are fine enough to prevent the passage of the grain therethrough, but are of a sufficient degree of coarseness to allow the powder to pass. It will thus be seen that any surplus powder which may remain in the cylinder will sift out through the perforations $4^a$ and will not discharge through the grain, thereby effecting a saving of the powder to be re-used.

The discharge end of the cylinder 3 preferably extends into a stationary drum or casing 5 having a removable drawer or the like 6 to receive the surplus powder discharged through the perforations $4^a$, said drum also having an outlet 7 for the treated grain which may discharge directly into a sack tied or held thereunder, as indicated at 8. A suitable valve 9 is provided for the outlet 7 to prevent the discharge of grain when removing a filled sack and substituting an empty one. The drum or casing 5 is supported on suitable legs 10 which I prefer to have vertically adjustable in order that the cylinder 3 may be inclined if desired to facilitate feeding of the grain and treating powder therethrough.

The perforated inlet end of the cylinder 3 is surrounded by a drum 11 to contain the grain treating powder or other medium 12 which will constantly gravitate to the lower portion of the drum. By means of movable dippers 13, however, predetermined quantities of the treating medium are elevated and dropped onto the perforated portion of the cylinder, so that these quantities may sift through the perforations 4 and mingle with the grain. In the preferred form of construction, the drum 11 is of frustro-conical shape in order that the powder or the like will slide toward the annular head 14 which closes the enlarged outer end of said drum. The dippers 13 are located in the angle between this head and the wall of the drum and consequently, it will be seen that they will operate even though a very small quantity of the treating powder may be present in the drum. These dippers are preferably in the form of straight strips of metal passing slidably through slots 15 in the head 14 and frictionally held in proper position. It will be seen that by moving these strips inwardly or outwardly, the capacity thereof may be varied, so that any desired quantity of the treating medium may be supplied to the cylinder.

Within the cylinder 3, I provide a helical conveyor 16 leading from its inlet end to its intermediate portion and provide a similar conveyor 17 leading from said intermediate portion to the discharge end of the cylinder. The inner ends of the conveyors are spaced apart and means are provided in the cylinder between said conveyors to thoroughly stir the treating medium and the grain, while feeding it through the cylinder at a slower rate of speed than it is fed by the conveyors 16 and 17, thus insuring more thorough contact of the treating powder or the like with the grain, than could be obtained otherwise. The means last referred to will be explained hereinafter, as this means is formed, in the present disclosure, by portions of certain longitudinal bars which constitute parts of the conveyors 16 and 17.

As shown most clearly in Fig. 9, each conveyor is formed of a plurality of circumferential sections 18, each of which is preferably although not necessarily of 360° in length. Each of these sections is cut from a sheet of metal and is originally in the form of a split ring with peripheral notches 19 at opposite sides of the split and similar notches 20 at other circumferentially spaced points. The ends of the ring however are pulled in directions parallel with the ring axis, so that each section takes the form of a convolution of the conveyor. In thus shaping the sections 18, their original diameter is decreased to some extent, so that the slots 19 all come in line with each other. Angle metal bars 21 have transverse notches 22 formed at spaced points in the ends of one flange, these bars being equal in number to the several alined rows of notches 19 and 20 with which the conveyor sections 18 are formed. The bars 21 are applied to the outer edge portions of the conveyor sections 18 so that their notches 22 interfit with the notches 19 and 20, thereby holding the conveyor sections 18 in proper relation to form the two continuous conveyors 16 and 17. At suitable points, radial bolts 23 (see Fig. 5) pass through the angle metal bars 21 and connect them with a central shaft 24 which passes through the entire cylinder and has its ends appropriately mounted in suitable bearings. The conveyor sections 18, bars 21, shaft 24, bolts 23 and a plurality of pitched paddles 25 on the center of said shaft, may be bodily inserted into the cylinder 3 after assembly and secured thereto by any desired means. The shaft 24 may of course be driven in any desired manner, but I prefer to provide it with a sprocket wheel so that a chain 26 may be employed to drive it from the upper shaft of the elevator 2. This driving of the shaft will in turn drive the entire cylinder 3, the conveying means within said cylinder and the drum 11 around the same.

The inwardly extending flanges of the angle metal bars 21 above described, are transversely divided, between the conveyors 16 and 17, into a plurality of separate areas constituting grain and powder agitating blades 27 whose ends are oppositely bent as indicated at 28 to slowly feed the grain toward the discharge end of the cylinder, simultaneously with the agitating operation. The pitched paddles 25 co-operate with the blades 27 in agitating and feeding the grain and the treating medium through the cylinder, but as above stated, the feeding at the intermediate portion of said cylinder is at a slower rate of speed than at the ends, insuring that the grain and the treating powder or the like shall be more thoroughly mixed than could otherwise be done.

The portions of the inwardly extending flanges of the bars 21 between the sections 18 of the conveyors 16 and 17, serve to additionally agitate the grain and the treating medium as they travel through the cylinder 3, but in order that these flanges may not interfere seriously with proper action of the conveyors, they are preferably cut away to some extent, between their notches 22, as indicated at 29.

By providing a machine constructed in or substantially in the manner herein disclosed, the grain may be easily, quickly and inexpensively treated and it will be seen that there will be no waste of surplus powder which may enter the cylinder as it will be sifted out through the perforations 4 and caught in the drawer 6, from which it may be returned to the drum 11. This drum will of course be provided with a suitable filling cap or the like (not shown).

As excellent results are obtainable from the details disclosed, they are preferably followed, but within the scope of the invention as claimed, numerous changes may be made.

I claim:—

1. A grain treating machine comprising a rotatable cylinder having a grain inlet and having its walls perforated throughout a portion of its length, a drum surrounding the perforated portion of said cylinder to contain a grain treating medium, and a dipper in said drum for elevating a predetermined quantity of its contents and dropping such quantities onto the perforated portion of the cylinder, said dipper being passed into the drum through a slot in the end thereof and movable into and out of the drum through the slot.

2. In a machine of the character described, the combination of an imperforate rotatably mounted cylinder provided at one end with a grain inlet and a separate inlet for grain treating material, said cylinder being provided at its other end with a grain outlet and a separate outlet for the grain treating material, means for rotating said cylinder, and means in said cylinder, operative by the rotation thereof, to mix the grain treating material with the grain and to simultaneously convey these substances from one end of said cylinder to the other end thereof.

3. In a machine of the character described, the combination of an imperforate rotatably mounted cylinder provided at end end with a grain inlet and a separate inlet for grain treating material, said cylinder being provided at its other end with a grain outlet and a separate outlet for the grain treating material, means for rotating said cylinder, and means in said cylinder, operative by the rotation thereof, to mix the grain treating material with the grain and to simultaneously convey these substances from one end of said cylinder to the other end thereof, the last named means being arranged so as to convey said substances faster through the end portions of said cylinder than through the intermediate portion thereof.

4. A machine of the class described comprising a rotatable cylinder adapted to receive material at one end and adapted for the discharge thereof at its other end, means in the inlet end of said cylinder for conveying the material to the intermediate portion of said cylinder, additional means in the other end of the cylinder for conveying the material away from said intermediate portion of the cylinder, and a longitudinal internal flange at the cylinder wall between said conveying means, said flange being transversely divided into separate areas and having the end portions of said areas bent to convey and stir the material.

5. In a machine of the character described, the combination of a cylinder provided with an inlet at one end and an outlet at the other end, helical conveyors fixed in the end portions of said cylinder, said conveyors being provided with central passages, and each being composed of a plurality of separate helical sections, longitudinal bars fixed within said cylinder and engaging the sections of said conveyors and maintaining said sections in place.

6. A structure as specified in claim 5; the portions of said bars between the two conveyors being transversely divided into separate areas whose ends are bent to agitate the material while passing through the cylinder from one conveyor to the other.

7. A machine of the class described comprising a cylinder adapted at one end to receive material, the other end of said cylinder being adapted for discharging the material, a helical conveyor in said cylinder occupying only a part of the length of said cylinder and formed of circumferential sections, longitudinal bars at the cylinder wall holding the conveyor sections in operative relation and extended beyond said conveyor, the extended ends of said bars constituting agitators.

8. A machine of the class described comprising a cylinder adapted at one end to receive material, the other end of said cylinder being adapted for discharging the material, a helical conveyor in said cylinder occupying only a part of the length of said cylinder and formed of circumferential sections, and longitudinal bars at the cylinder wall holding the conveyor sections in operative relation and extended beyond said conveyor, and being transversely divided into separate areas whose ends are bent to form agitators.

In testimony whereof I have hereunto affixed my signature.

SAMUEL A. WEITMAN.